ତ୍ତ2,951,075
Patented Aug. 30, 1960

2,951,075

16-LOWER ALKYL STEROIDS

Meyer Sletzinger, North Plainfield, and Sandor Karady, Rahway, N.J., assignors to Merck & Co., Inc., Rahway, N.J., a corporation of New Jersey No Drawing. Filed Apr. 25, 1958, Ser. No. 730,771

10 Claims. (Cl. 260—239.57)

This invention is concerned generally with novel steriod compounds and with novel processes of preparing the same. More particularly, it relates to steroid epoxylacto-enol compounds and processes for the production and hydrolysis thereof.

The 16α-alkyl-3α,17α-dihydroxy-11,20-pregnane-dione and 16β-alkyl-3α,17α-dihydroxy - 11,20 - pregnane-dione compounds produced in accordance with this invention can be readily converted to 16α-alkyl-17α,21-dihydroxy-1,4-pregnadiene-3,11,20-trione 21-acetate or 16β-alkyl-17α,21 - dihydroxy-1,4-pregnadiene-3,11,20-trione 21-acetate compounds which possess extremely high antiinflammatory activity and are especially effective in the treatment of arthritis and related diseases since they can be administered for their cortisone-like action in extremely low dosage thereby minimizing undesired side effects.

The present novel process provides a ready approach to the introduction of an hydroxy group in the 17-position in a hindered steroid such as 16α-alkyl or 16β-alkyl in which the normal methods of introduction are subject to steric hindrance.

In preparing 16α - alkyl - 3α,17α-dihydroxy-11,20-pregnanedione or 16β-alkyl-3α,17α-dihydroxy-11,20-pregnanedione, we utilize as a starting material either 16α-alkyl-11,20-pregnanedione having an acyloxy or hydroxy group in the 3-position or 16β-alkyl-11,20-pregnanedione having an acyloxy or hydroxy group in the 3-position which may be represented by the following formula

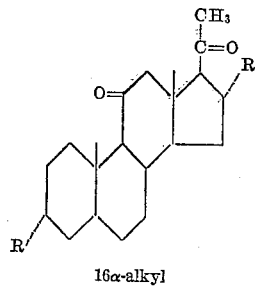

16α-alkyl or

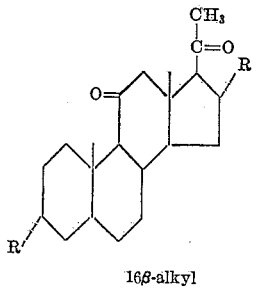

16β-alkyl wherein R is an alkyl group, such as methyl, ethyl, propyl, or butyl, etc., and R′ is acyloxy or hydroxy.

Either of the above compounds can be reacted with an alkyl oxalate to form the corresponding alkyl ester of 16α-alkyl-11,20-dioxo-21-pregnaneglyoxylate having an acyloxy group or hydroxy group in the 3-position or the alkyl ester of 16β-alkyl-11,20-dioxo-21-pregnaneglyoxylate having an acyloxy or hydroxy group in the 3-position which can be indicated graphically

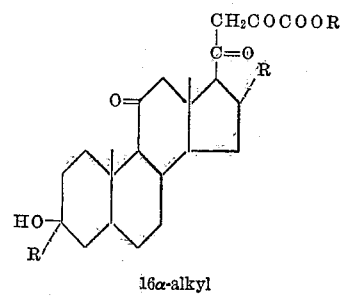

16α-alkyl or

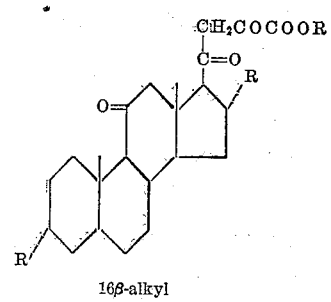

16β-alkyl wherein R and R′ are as above.

Upon hydrolysis of either of the above compounds, the ester group is replaced by hydrogen to form the corresponding 16α-alkyl-3α-hydroxy - 11,20 - dioxo-21-pregnaneglyoxylic acid or 16β-alkyl-3α-hydroxy-11,20-dioxo-21-pregnaneglyoxylic acid which may be identified as follows:

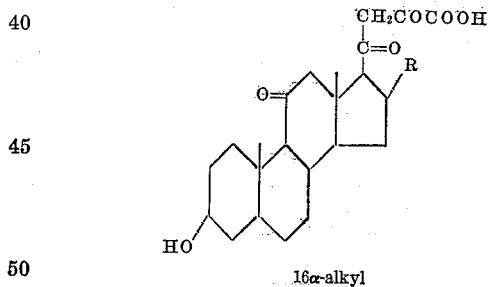

16α-alkyl or

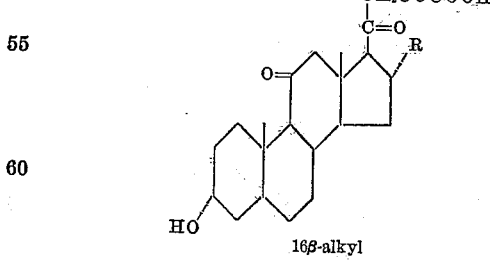

16β-alkyl wherein R is as above.

Reaction of either 16α-alkyl-3α-hydroxy-11,20-dioxo-21-pregnaneglyoxylic acid or 16β-alkyl-3α-hydroxy-11,20-dioxo-21-pregnaneglyoxylic acid with an acyl anhydride in the presence of the catalytic action of any strong acid such as perchloric acid, hydrobromic acid or dinitrobenzene sulfonic acid results in the formation of either an isomer mixture of 3α-23-diacyloxy-16α-alkyl-21-normethyl-11-oxo-17(20),22-choladieno-24(20)-lactone or an isomeric mixture of 3α,23-diacyloxy-16β-alkyl-21-nor-methyl - 11 - oxo - 17(20),22 - chloadieno-24(20)-lactone which may be represented

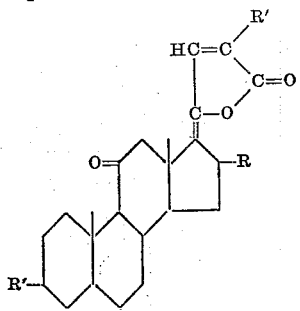
an isomeric mixture of 16α-alkyl or

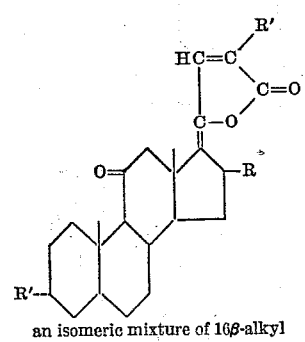
an isomeric mixture of 16β-alkyl wherein R and R' are as above.

Treatment of either the isomeric mixture of 3α,23-di-acyloxy-16α-alkyl - 21 - normethyl - 11 - oxo-17(20),22-choladieno-24(20)-lactone or an isomeric mixture of 3α, 23 - diacyloxy-16β-alkyl-21-normethyl-11-oxo-17(20),22-choladieno-24(20)-lactone with any peracid such as monoperphthalic, peracetic or perbenzoic acid yields either an isomeric mixture of 3α,23-diacyloxy-16α-alkyl-17(20)-epoxido-21-normethyl - 11 - oxo-22-choleno-24-(20)-lactone, or an isomeric mixture of 3α,23-diacyloxy-16β-alkyl-17(20)-epoxido - 21 - normethyl - 11 - oxo-22-choleno-24(20)-lactone which have the following formula

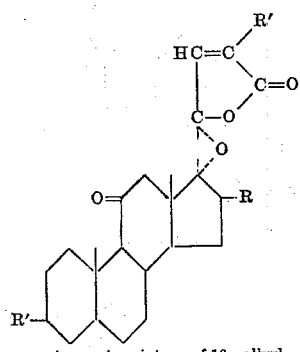
an isomeric mixture of 16α-alkyl or

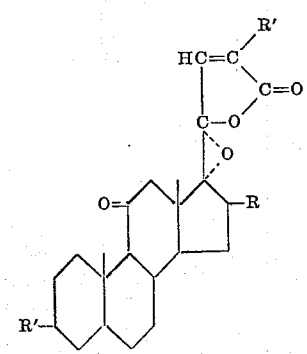
an isomeric mixture of 16β-alkyl wherein R and R' are as above.

Upon hydrolysis of either an isomeric mixture of 3α, 23 - diacyloxy-16α-alkyl-17(20) - epoxido-21-normethyl-11-oxo-22-choleno-24(20)-lactone, or an isomeric mixture of 3α,23 - diacyloxy - 16β - alkyl-17(20)-epoxido-21-normethyl-11-oxo-22-choleno-24(20)-lactone there is obtained 16α - alkyl-3α,17α-dihydroxy-11,20-pregnanedione or 16β - alkyl - 3α,17α - dihydroxy-11,20-pregnanedione may be represented as follows

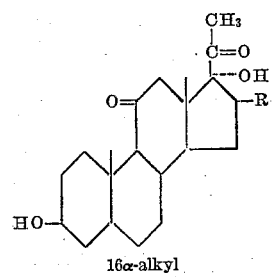
16α-alkyl or

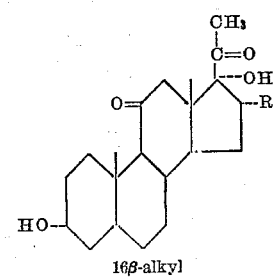
16β-alkyl wherein R is as above.

Alternatively, either an isomeric mixture of 3α,23-di-acyloxy-6α-alkyl-17(20)-epoxido-21-normethyl - 11 - oxo-22-choleno-24(20)-lactone or an isomeric mixture of 3α,23 - diacyloxy-16β-alkyl-17(20)-epoxido-21-normethyl-11-oxo-22-choleno-24(20)-lactone can be reacted with potassium bicarbonate to form 16α-alkyl-3α,17α-dihydroxy-11,20-dioxo-21-pregnaneglyoxylic acid or 16β-alkyl - 3α,17α-dihydroxy-11,20-dioxo-21-pregnaneglyoxylic acid which may be represented as follows

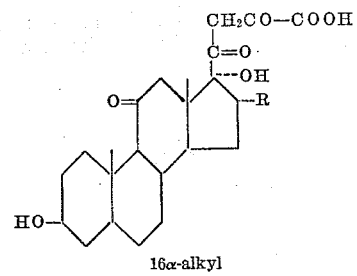
16α-alkyl or

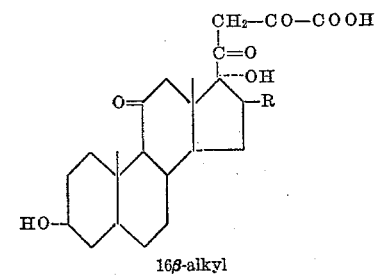
16β-alkyl

Either of the above compounds can be hydrolyzed to form 16α-alkyl-3α,17α-dihydroxy-11,20-pregnanedione or 16β-alkyl-3α,17α-dihydroxy-11,20-pregnanedione.

The 16α - alkyl-3α,17α-dihydroxy-11,20-pregnanedione or 16β-alkyl-3α,17α-dihydroxy-11,20-pregnanedione obtained by our novel process can be readily converted to 16α-alkyl - 17α - 21 - dihydroxy-1,4-pregnadiene 3,11,20- trione or 16β-alkyl-7α,21-dihydroxy-1,4-pregnadiene-3,11,20-trione, which compounds possess marked and enhanced anti-arthritic properties. This process involves reacting 16α-alkyl-3α,17α-dihydroxy-11,20-pregnanedione with bromine in chloroform to form 16α-alkyl-21-bromo-3α,17α-dihydroxy-11,20-pregnanedione, which is reacted with sodium iodide in acetone to produce 16α-alkyl-3α,17α-dihydroxy-21-iodo-11,20-pregnanedione which is converted without isolation to 16α-alkyl-3α,17α,21-trihydroxy-11,20-pregnanedione 21-acetate by reaction with anhydrous potassium acetate. The 16α-alkyl-3α,17α,21-trihydroxy-11,20-pregnanedione 21-acetate is contacted with a vegetative growth of a culture of *Nocardia blackwellii* (American Type Culture Collection 6846) microorganism to yield 16α-alkyl-17α-hydroxy-1,4-pregnadiene-3,11,20-trione.

The following examples are to be understood as illustrative only and are in no way to be construed as limiting the invention:

*Example 1*

To 3.18 g. of sodium was added dropwise 35 ml. of methanol and hydrogen was evolved. After all methanol was added, the sodium was all dissolved. To this solution was added 100 cc. of toluene and the methanol distilled using a column to prevent entrainment of toluene. When the boiling point of toluene was reached (110° C.), the reaction was cooled to 25° C. To the reaction mixture was added 24.2 g. of diethyl oxalate and the mixture cooled when necessary to maintain a 20-25° C. temperature. With agitation, 10 g. of finely powdered 3α-acetoxy-16α-methyl-11,20-pregnanedione prepared as described hereinafter was added. The total mixture was stirred for 18 hours and clear yellow solution containing ethyl-3α-acetoxy-16α-methyl-11,20-dioxo - 21 - pregnaneglyoxylate resulted.

The solution of ethyl 3α-acetoxy-16α-methyl-11,20-dioxo-21-pregnaneglyoxylate was added slowly with stirring to 200-250 cc. of petroleum ether. A solid sodium salt of ethyl 3α-acetoxy-16α-methyl-11,20-dioxo-21-pregnaneglyoxylate precipitated. The mixture was filtered, washed with petroleum ether, and dried.

In order to hydrolyze ethyl 3α-acetoxy-16α-methyl-11,20-dioxo-21-pregnaneglyoxylate, the solid was slurried in 70 cc. of methanol and to this was added 280 cc. of 0.5 N sodium hydroxide slowly in 20 minutes. The mixture was stirred at 25° C. for five minutes. At the end of this time a turbid mixture occurred. To this turbid reaction mixture was added 9 g. of diatomaceous earth and the mixture filtered through a pad of diatomaceous earth. The filtrate was acidified, with stirring, by adding 1 N hydrochloric acid slowly. The fluffy white precipitate, 3α-hydroxy-16α-methyl-11,20-dioxo-21-pregnaneglyoxylic acid, was filtered and washed well with water and dried in vacuo at 60° C. until Karl Fisher for water was less than 0.5%. Yield 10.05 g. of 3α-hydroxy-16α-methyl-11,20-dioxo-21-pregnaneglyoxylic acid which had a melting point of 239-240° C. dec. (93%)

$$\lambda_{max.}^{MeOH}\ 2940\ E\%\ 239$$

In like manner, 3α-hydroxy-16β-methyl-11,20-dioxo-21-pregnaneglyoxylic acid can be prepared by reacting 3α-acetoxy-16β-methyl-11,20-pregnanedione with ethyl oxalate to form ethyl 3α-acetoxy-16β-methyl-11,20-dioxo-21-pregnaneglyoxylate and hydrolyzing the latter compound.

The 3α-acetoxy-16α-methyl-11,20-pregnanedione used as a starting material in the above example is prepared starting with the known 3α-acetoxy-16-pregnene-11,20-dione, in accordance with the following procedure:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 3α-acetoxy-16-pregnene-11,20-dione in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated and the ethereal layer is washed with three 50 ml. portions of water. The washed ethereal layer is dried, and the solvent evaporated in vacuo to give a brown viscous oil. The latter material is heated for 15 minutes at 60-70° C. with a mixture of 25 ml. of acetic anhydride and 25 ml. pyridine and the acetylated product is purified by chromatography on acid-washed alumina followed by crystallization from petroleum ether to give approximately 1.5 g. of substantially pure 3α-acetoxy-16α-methyl-11,20-pregnenedione.

The 3α-acetoxy-16β-methyl-11,20-pregnanedione used as a starting material is prepared starting with the known 3α-acetoxy-16-pregnene-11,20-dione in accordance with the following procedure:

A mixture of 70 g. of 3α-acetoxy-16-pregnene-11,20-dione, 140 ml. of piperidine, and 500 ml. of nitromethane was kept at 25° C. for 65 hours. The mixture was concentrated in vacuo to a small volume, and flushed twice with 100 ml. portions of toluene. The residue was taken up on 300 ml. of methylene chloride, washed with 50 ml. of 2.5 N hydrochloric acid, and then with water. After drying over anhydrous magnesium sulfate, the methylene chloride was removed by vacuum distillation. The residue was taken up in 100 ml. of hot benzene, and filtered while still warm. To the warm filtrate, 200 ml. of hexane were added slowly. After the mixture had been cooled at 5° C., the crystalline product 3α-acetoxy-16-nitromethyl-11,20-pregnanedione was filtered off and washed with hexane. The product contained solvent of crystallization M.P. 90-98° C.

A mixture of 2.0 g. of 3α-acetoxy-16-nitromethyl-11,20-pregnanedione, 1.1 ml. of 37% formaldehyde solution, 46 mg. of sodium acetate, 50 ml. of methanol, and 2.7 g. of Raney nickel was hydrogenated at 41 psi initial pressure and at room temperature. The uptake of hydrogen ceased after 92% of the theoretical amount had been absorbed. After filtration of the catalyst, the filtrate was concentrated to approximately 10 ml. The product 3α-acetoxy-16-dimethylaminomethyl-11,20-pregnanedione was filtered off and washed with methanol.

A mixture of 4.92 g. of 3α-acetoxy-16-dimethylaminomethyl-11,20-pregnanedione, 130 ml. of methanol, and 3.63 ml. of 30% hydrogen peroxide was stirred at room temperature for 256 hours. The excess hydrogen peroxide was decomposed by the addition of a small amount of platinum black and stirring for several hours. The catalyst was filtered off and the filtrate was concentrated in vacuo to give a nearly quantitative yield of 3α-acetoxy - 16 - dimethylaminomethyl - 11,20 - pregnanedione N-oxide which was an amorphous glass.

One gram of the crude 3α-acetoxy-16-dimethylaminomethyl-11,20-pregnanedione N-oxide was heated in an oil bath under vacuum. The temperature was increased gradually to 150° C., where it was held for one hour. The residual material was subjected to chromatography on alumina, whereby 150 mg. of 3α-acetoxy-16-methyl-16-pregnene-11,20-dione was obtained.

To a solution of 200 mg. of 3α-acetoxy-16-methyl-16-pregnene-11,20-dione in 20 ml. of methanol was added 200 mg. of 25% palladium on calcium carbonate catalyst. The mixture was stirred in hydrogen (1 atmosphere pressure, 25° C.) until hydrogen uptake was complete. The mixture was filtered, the filtrate taken to dryness and the residue crystallized from ether-hexane to give 3α-acetoxy-16β-methyl-11,20-pregnanedione.

Example 2

To a slurry of 1.0 g. (2.39 m.) of 3α-hydroxy-16α-methyl-11,20-dioxo-21-pregnaneglyoxylic acid in 10 ml. of acetic anhydride was added 30 mg. of 2,4-dinitrobenzene-sulfonic acid. The solid was completely in solution after about 15 minutes. The solution was stirred at 25° C. for 2.5 hours and then concentrated in vacuo to a thick syrup (water bath at 50° C.). The syrup was dissolved in 25 ml. of benzene and washed twice with 10 ml. portions of 2.5 N sodium hydroxide and 10 ml. of water. After drying the benzene solution with magnesium sulfate, the reaction mixture was concentrated in vacuo to 1.2 gms. of amorphous solid which is an isomeric mixture of 3α,23-diacetoxy-16α-methyl-21-normethyl-11-oxo-17(20),22-choladieno-24(20)-lactone $\lambda_{max.}^{CH_3Cn}$ 2970, E% 432

The crude isomeric mixture of 3α,23-diacetoxy-16α-methyl - 21 - normethyl - 11 - oxo-17(20),22-choladieno-24(20)-lactone was crystallized from 4 ml. of ethanol to give 950 mg. (82%)

$\lambda_{max.}^{CH_3CN}$ 2980, E% 474

In a similar manner, 3α-hydroxy-16β-methyl-11,20-dioxo-21-pregnaneglyoxylic acid can be reacted with acetic anhydride in the presence of a strong acid catalyst to form an isomeric mixture of 3α,23-diacetoxy-16β-methyl - 21 - normethyl - 11 - oxo - 17(20),22 - choladieno-24(20)-lactone.

Example 3

8.5 g. of an isomeric mixture of 3α,23-diacetoxy-16α-methyl - 21 - normethyl - 11 - oxo - 17(20),22 - choladieno-24(20)-lactone was added to 110 cc. of the benzene solution of perbenzoic acid and allowed to stand at 25° C. for 140 hours. The reaction was then cooled to 15° C. and washed with 50 cc. of water. Finally the excess acid was removed by extracting three times with 50 cc. portions of 10% sodium bicarbonate solution and then washed twice with 50 cc. portions of water. The aqueous layer was backwashed twice with 25 cc. portions of benzene and the combined organic extract dried over sodium sulfate, filtered and concentrated in vacuo to an oily residue. This residue readily crystallized. The yield was quanitative. In order to separate from ethyl benzoate the crystalline residue was refluxed with 160 cc. of petroleum ether and filtered. The crystalline precipitate, an isomeric mixture of 3α,23-diacetoxy-17(20) - epoxido - 16α - methyl - 21 - normethyl - 11-oxo-22-choleno-24(20)- lactone weighed 8.9 g. (100%)

$\lambda_{max.}^{acetonitrile}$ 2260, E% 228

In like manner, an isomeric mixture of 3α,23-diacetoxy-16β-methyl-21-normethyl - 11 - oxo-17(20),22-choladieno-24(20)-lactone can be reacted with peracid to form a mixture of isomers of 3α,23-diacetoxy-17(20)-epoxido-16β-methyl-21-normethyl-11-oxo-22-choleno-24(20)-lactone.

Example 4

In order to hydrolyze the isomeric mixture of 3α,23-diacetoxy - 17(20) - epoxido-16α-methyl-21-normethyl-11-oxo-22-choleno-24(20)-lactone, 3 g. of a mixture of isomers of 3α,23-diacetoxy - 17(20) - epoxido-16α-methyl-21-normethyl-11-oxo-22-choleno-24(20)-lactone was suspended in 20 cc. of ethanol and to this mixture was added dropwise, with stirring 28 cc. of 1 N sodium hydroxide. This reaction is exothermic and cooling is necessary in order to maintain the temperature between 25–30° C. The time of addition was 30 minutes, during which period all the solid dissolved. An additional 100 cc. of 1 N sodium hydroxide was now added and the total solution stirred at 25° C. for 18 hours. Crystals of 3α,17α-dihydroxy-16α-methyl-11,20-pregnanedione separated after two hours. The reaction was acidified with 2.5 N hydrochloric acid and extracted three times with 50 cc. portions of ethyl acetate. The organic layer was washed with saturated sodium bicarbonate solution to remove excess acid. After washing with water, the ethyl acetate layer was dried over anhydrous sodium sulfate, filtered and concentrated to 5 to 6 cc. until crystallization occurred. The solution was cooled and filtered and washed with cold ethyl acetate. After drying in vacuo the 3α,17α-dihydroxy-16α-methyl-11,20-pregnanedione weighed 1.36 g. (62.7) M.P. 191–193° C. The mother liquors were concentrated to 1 cc. and deposited an additional .175 g. of 3α,17α - dihydroxy-16α-methyl - 11,20 - pregnanedione of M.P. 187–190° C. The total yield of product therefore was 71.3%.

*Analysis.*—Calculated for $C_{20}H_{30}O_4$: C, 73.90; H, 9.20. Found: C, 73.27; H, 9.45.

In like manner, an isomeric mixture of 3α,23-diacetoxy-17(20) - epoxido - 16β - methyl - 21 - normethyl - 11 - oxo-22-choleno-24(20)-lactone can be hydrolyzed to form 3α,17α-dihydroxy-16β-methyl-11,20-pregnanedione.

Example 5

200 mg. of an isomeric mixture of 3α,23-diacetoxy-17(20) - epoxido - 16α - methyl - 21 - normethyl - 11 - oxo-22-choleno-24(20)-lactone was suspended in 3 ml. of methanol and 0.2 ml. of water to this mixture was added 145 mg. of potassium bicarbonate. The slurry mixture was boiled for one hour on a steam bath. During this time the steroid went into solution and the majority of the potassium bicarbonate went into solution. Dilution with 15 cc. of water causes a turbid solution which was extracted with benzene. The turbid water layer was heated to get rid of the emulsified benzene. The solution upon acidification yields 126 mg. (74%) yield of a white solid 3α,17α-dihydroxy-16α-methyl-11,20-dioxo-21-pregnaneglyoxylic acid.

In order to hydrolyze the 3α,17α-dihydroxy-16α-methyl-11,20-dioxo-21-pregnaneglyoxylic acid to 3α,17α-dihydroxy-16α-methyl-11,20-pregnanedione, 20 mg. of 3α,17α-dihydroxy - 16α - methyl - 11,20 - dioxo - 21 - pregnaneglyoxylic acid was dissolved in 1 cc. of 1 N sodium hydroxide and the mixture heated to 90° C. for ten minutes. The mixture was filtered and the precipitate washed with water and dried. There was recovered 3α,17α-dihydroxy-16α-methyl-11,20-pregnanedione.

In like manner, an isomeric mixture of 3α,23-diacetoxy-17(20) - epoxido - 16β - methyl - 21 - normethyl-11-oxo-22-choleno-24(20)-lactone can be substituted in the above procedure to form 3α,17α-dihydroxy-16β-methyl-11,20-dioxo-21-pregnaneglyoxylic acid which can then be hydrolyzed to form 3α,17α-dihydroxy - 16β - methyl - 11,20-pregnanedione.

Example 6

3α,17α - dihydroxy - 16α - methyl - 11,20 - pregnanedione prepared by the procedures of Examples 4 and 5 can be readily converted to 17α,21-dihydroxy-16α-methyl-1,4-pregnadiene-3,11,20-trione by the following procedure:

To a solution of 3.5 grams of 3α,17α-dihydroxy-16α-methyl-11,20-pregnanedione in 25 ml. of chloroform is added dropwise with stirring a solution containing 1.68 grams of bromine in 12.1 ml. of chloroform over a period of 60 minutes. The reaction mixture is dissolved in 100 ml. of ethyl acetate and the resulting solution washed with water until neutral, dried and the solvents evaporated therefrom in vacuo. The residual ground material is dissolved in a minimum quantity of ethyl acetate. The resulting solution is diluted with ether and the mixture is stirred until crystals form. The crystalline product is recovered by filtration and washed by slurrying with 50:50 ether-petroleum mixture to give 21-bromo-3α,17α-dihydroxy-16α-mtehyl-11,20-pregnanedione.

2.5 grams of 21-bromo-3α,17α-dihydroxy-16α-methyl-11,20-pregnanedione is mixed with 2.5 grams of anhydrous potassium acetate, 2.0 grams of sodium iodide and 0.015 ml. of glacial acetic acid and 50 ml. of acetone is added to the resulting mixture. This mixture is then heated at reflux with stirring for a period of 16 hours, and the reaction is cooled, filtered, and the insoluble material is washed with acetone. The filtered solution is evaporated in vacuo, thereby removing the solvents, and the residual material is slurried with water and the aqueous mixture extracted with ethyl acetate. The ethyl acetate extract is washed with water to neutrality, dried, and the solvent is evaporated in vacuo to give an oil. This oil is crystallized from ether to give 3α,17α,21-trihydroxy-16α-methyl-11,20-pregnanedione-21-acetate.

A nutrient medium is prepared containing the following ingredients:

Cerelose _____ grams__ 68
Edamin _____ do____ 68
Corn steep liquor _____ ml__ 17
Distilled water to make 3400 ml.

The medium is adjusted to pH 6.5 with potassium hydroxide sterilized and inoculated with about 100 ml. of a vegetative growth of a culture *Nocardia blackwellii* (American Type Culture Collection 6846). Microorganisms and the inoculated culture is then incubated at a temperature of 28° C. with agitation and aeration for a 48 hour period. To the resulting culture is added a solution containing 0.32 g. of 3α,17α,21-trihydroxy-16α-methyl-11,20-pregnanedione 21-acetate dissolved in dimethyl formamide. The culture containing the steroid can be incubated with agitation and aeration for an additional period of about 24 hours at 28° C.

The fermentation broth is extracted with ethyl acetate and the extract separated and evaporated to dryness. The residual dried product is partitioned between petroleum ether and 70% aqueous methanol, the petroleum ether layer being discarded. The aqueous methanol containing the product is evaporated under reduced pressure to remove the methanol. The resulting water layer is extracted with ethyl acetate several times and the ethyl acetate layer evaporated to dryness to yield 17α,21-dihydroxy-16α-methyl - 1,4 - pregnadiene-3,11,20-trione 21-acetate.

It should be understood that various changes may be made in our process as herein described without affecting the results attained. Thus, various modifications of time, temperature, alkalinity, acidity, etc. and various changes in procedure differing from those herein given as illustrative of the preferred embodiments of our invention may be made without departing from the scope thereof. Accordingly, the scope of our invention is to be determined in accordance with the prior art and appended claims.

We claim:
1. 16α - lower alkyl - 3α,17α - dihydroxy - 11,20 - dioxo - 21 - pregnaneglyoxylic acid.
2. 3α,17α - dihydroxy - 16α - methyl - 11,20 - dioxo-21 - pregnaneglyoxylic acid.
3. 3α,17α - dihydroxy - 16β - methyl - 11,20 - dioxo-21 - pregnaneglyoxylic acid.
4. The process which comprises reacting 3α-hydroxy-16α-methyl-11,20-dioxo - 21 - pregnaneglyoxylic acid with acetic anhydride in the presence of 2,4-dinitrobenzenesulfonic acid to form an isomeric mixture of 3α,23-diacetoxy - 16α - methyl - 21 - normethyl - 11 - oxo - 17(20),22 - choladieno - 24(20) - lactone.
5. The process which comprises reacting 3α-hydroxy-16β-methyl-11,20-dioxo - 21 - pregnaneglyoxylic acid with acetic anhydride in the presence of 2,4-dinitrobenzenesulfonic acid to form an isomeric mixture of 3α,23-diacetoxy-16β-methyl - 21 - normethyl-11-oxo-17(20),22-choladieno-24(20)-lactone.
6. The process which comprises reacting an isomeric mixture of 3α,23 - diacetoxy - 16α - lower alkyl - 17(20)-epoxido - 21 - normethyl - 11 - oxo - 22 - choleno - 24(20)-lactone with potassium bicarbonate to form 16α-lower alkyl - 3α,17α - dihydroxy - 11,20 - dioxo - 21 - pregnaneglyoxylic acid.
7. The process which comprises reacting an isomeric mixture of 3α,23-diacetoxy-16β-lower alkyl-17(20)-epoxido - 21 - normethyl - 11 - oxo - 22 - choleno - 24(20)-lactone with potassium bicarbonate to form 16β-lower alkyl - 3α,17α - dihydroxy - 11,20 - dioxo - 21 - pregnaneglyoxylic acid.
8. The process which comprises hydrolyzing 16α-lower alkyl - 3α,17α - dihydroxy - 11,20 - dioxo - 21 - pregnaneglyoxylic acid to form 16α-lower alkyl-3α,17α-dihydroxy-11,20-pregnanedione.
9. The process which comprises hydrolyzing 16β-lower alkyl-3α,17α-dihydroxy-11,20-dioxo-21-pregnaneglyoxylic acid to form 16β-lower alkyl-3α,17α-dihydroxy-11,20-pregnanedione.
10. 16β - lower alkyl - 3α,17α - dihydroxy - 11,20-dioxo - 21 - pregnaneglyoxylic acid.

References Cited in the file of this patent
UNITED STATES PATENTS

| | | |
|---|---|---|
| 2,740,782 | Hogg et al. | Apr. 3, 1956 |
| 2,740,783 | Hogg et al. | Apr. 3, 1956 |
| 2,774,776 | Hogg et al. | Dec. 18, 1956 |